Figure 6:
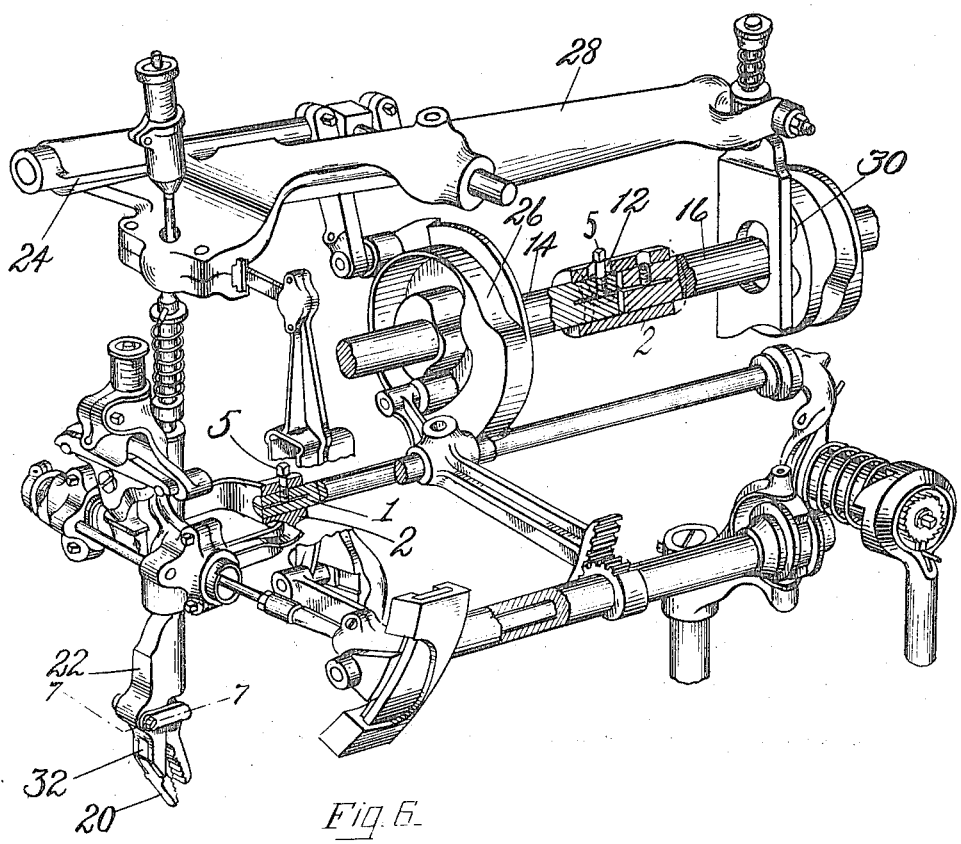

A. C. SPENCER.
COUPLING.
APPLICATION FILED JAN. 26, 1907.
1,141,281.
Patented June 1, 1915.
2 SHEETS—SHEET 1.
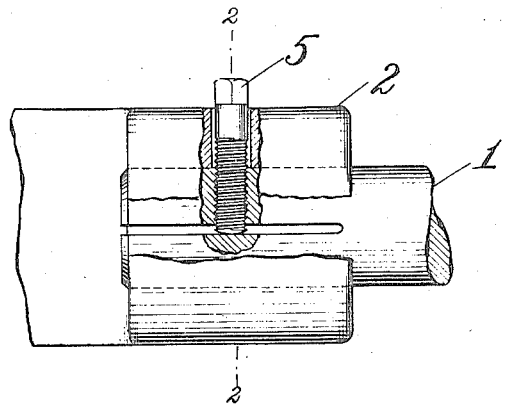
Fig. 1.
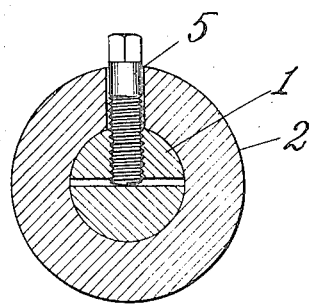 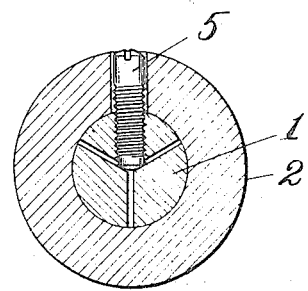
Fig. 2.  Fig. 3.
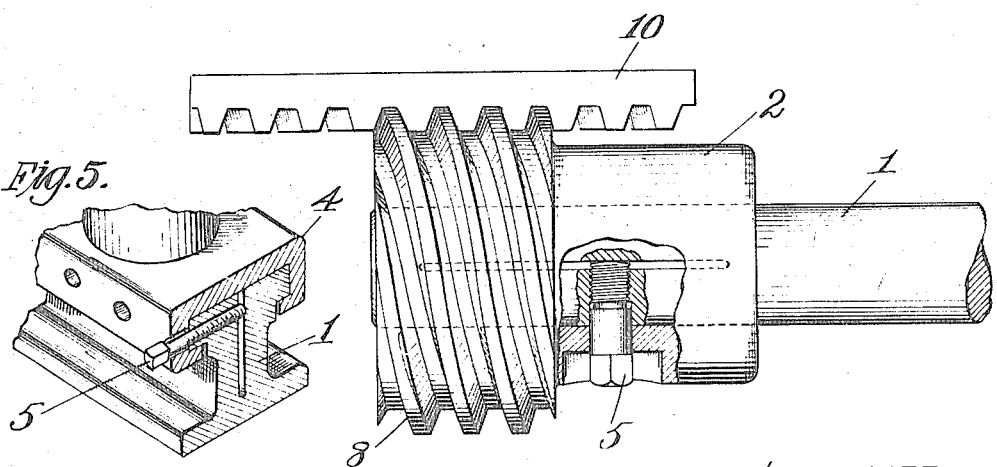
WITNESSES.
Edith C. Holbrook
Elizabeth C. Coupe
Fig. 4.
INVENTOR.
Alvah C. Spencer
By his Attorney
Nelson W. Howard

UNITED STATES PATENT OFFICE.

ALVAH C. SPENCER, OF BEVERLY, MASSACHUSETTS, ASSIGNOR TO UNITED SHOE MACHINERY COMPANY, OF PATERSON, NEW JERSEY, A CORPORATION OF NEW JERSEY.

COUPLING.

1,141,281.

Specification of Letters Patent.

Patented June 1, 1915.

Application filed January 26, 1907. Serial No. 354,207.

*To all whom it may concern:*

Be it known that I, ALVAH C. SPENCER, a citizen of the United States, residing at Beverly, in the county of Essex and Commonwealth of Massachusetts, have invented certain Improvements in Couplings, of which the following description, in connection with the accompanying drawings, is a specification, like reference characters on the drawings indicating like parts in the several figures.

This invention relates to couplings for shafts and other parts which are to be connected, and has for its object to provide a coupling or connection by which parts may be rigidly held together in desired relation and may be readily disconnected when desired.

In the illustrated embodiment of the invention an inner member, which may be a shaft, bar, or the like, is slitted or divided to permit it to be expanded within an outer member, which is formed to embrace the inner member and be secured or clamped thereto by the expansion of the inner member. Combined with the inner and outer members is employed an expanding device, herein shown as a screw which is threaded into a transverse aperture in one section of the slitted inner member and engages another section or sections to expand said member. Preferably the expanding device is arranged to cause the inner member to expand in opposed directions so that it is centered in the opening in the outer member. The outer member is provided with an aperture which is adapted to be positioned in alinement with the threaded aperture in the shaft and through which the screw may be reached to operate it. Preferably the expanding device will extend into the aperture in the outer member through which it is operated whereby it serves as a lock extending transversely into the two members and insuring against their accidental separation even though the inner member may become loose in the outer member. This feature of the invention is of especial advantage in a coupling in which the two connected members are subjected to relative longitudinal strains. Provision for limited relative adjustment of the inner and outer members may be made by elongating into a slot the aperture in the outer member. This permits, for example, two parts of a shaft united by this coupling to be relatively adjusted for varying the effective length of the shaft. If desired, the outer member may be provided with a plurality of apertures to permit it to be adjusted with relation to the inner member and the expanding device to be operated through one or another of said plurality of apertures.

The coupling as thus far described forms a secure and a very rigid connection between the inner and outer members. In positions where the connected members are subjected to extraordinary strains the inner and outer members may be provided with interlocking parts particularly arranged to assist in resisting relative movements in the directions of the strains. For the purpose of explaining the invention several applications thereof have been illustrated, including the use of this coupling for securing to its carrier a rigid gripper jaw of a lasting machine of well-known construction. In the operation of this machine this gripper jaw is subjected to severe strains and the jaw is herein shown see Figures 6 and 7, as connected to its shaft, which constitutes the inner member of the coupling, by a neck that interlocks with the gripper carrier which is the outer member of the coupling. The jaw is also provided with cheek plates which fit against the sides of the carrier and resist angular movement of the jaw with relation to the carrier.

The several features of the invention, including certain details of construction and arrangement of parts, will be more fully explained in the following description and pointed out in the claims.

The accompanying drawings, which form a part of this specification, illustrate the invention in the best form known to me. Other embodiments of the invention will readily occur to those skilled in the art.

Figure 7:
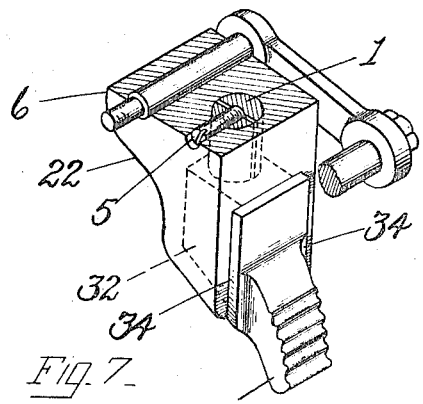
Figure 8:
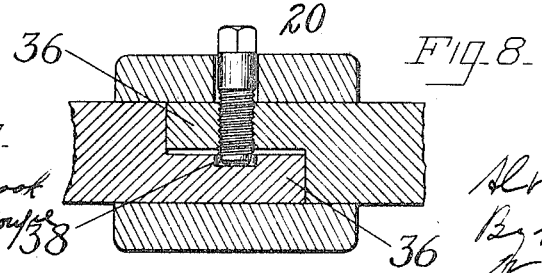

Figure 1 is a side elevation, parts being broken away, illustrating the improved coupling. Fig. 2 is a section on line 2—2, Fig. 1. Fig. 3 is a similar section of a modification. Fig. 4 illustrates an application of the coupling for connecting parts which are subjected to relative longitudinal strains. Fig. 5 is a further modification embodying this invention. Fig. 6 is a perspective view of the grippers-operating mechanism of a lasting machine and illustrates the use of this coupling for connecting various parts of the mechanism. Fig. 7 is a sectional view on the line 7—7 of Fig. 6 and illustrates the combination, with the simpler form of the coupling, of interlocking parts on connected members which are shown as a gripper jaw and its carrier. Fig. 8 is a sectional view of a modified form of the coupling.

The coupling comprises an inner member 1, which may be a shaft, rod, bar or other part and will be herein sometimes referred to generically as a "shaft," and an outer member, which may be a sleeve, hub, or the like, as indicated at 2, adapted to inclose the inner member, or it may be a part of any suitable shape formed to embrace or partially inclose the inner member, as shown at 4 in Fig. 5 and at 22 in Fig. 7. The inner member is slitted longitudinally to permit it to be expanded. The slits may, if desired, extend to the end of the inner member, forming as shown in Figs. 1 and 6 a split shaft comprising two sections or a larger number of shaft sections, as is shown, for example, in Fig. 3. The inner member is further provided with a transverse threaded aperture adapted to receive a screw 5 by which said member may be expanded to cause it to bind within the outer member, thus securing the two members together. The aperture may extend perpendicularly to a single slit in the inner member as shown in Figs. 1, 2, 4, 5, 6 and 7 or the shaft may be provided with a plurality of slits and the aperture for the expanding device may be located in any suitable relation to the slits for expanding and centering the several sections of the shaft, as shown, for example, in Fig. 3. The outer member is provided with an aperture adapted to be alined with the threaded aperture in the inner member and through which the screw may be manipulated for expanding the inner member. Preferably the screw will be long enough to extend into the aperture in the outer member and thus form a pin or lock for preventing accidental separation of the inner and outer members even when the inner member is not sufficiently expanded to hold the two members rigidly. This provision of a lock for preventing accidental separation of the two members is of especial value in a connection wherein the two members are subjected to longitudinal strains,—as, for example, in the mechanism illustrated in Fig. 4, wherein the outer member 2 is provided with a worm 8 for driving a rack bar 10. The resistance offered by the rack bar will, of course, tend to move the outer member longitudinally with relation to the inner member, but the screw 5 prevents the possibility of this movement. The outer member may, if desired, be counterbored, as shown in Fig. 4, to receive a tool for embracing the head of the screw to adjust it, thus rendering it unnecessary for the screw to project beyond the outer member. The outer member may be provided with a series of apertures, as shown in Fig. 5, any one of which may be alined with the threaded aperture in the inner member. This construction permits of relative adjustment of the inner and outer members. A limited adjustment may be provided by elongating the aperture in the outer member to form a slot, as shown at 12 in Fig. 6, wherein the coupling is employed for adjustably uniting the two parts 14 and 16 of an extensible shaft, one part, 14, of which is split to form two sections.

In Fig. 6, which illustrates the grippers-operating mechanism of a lasting machine, which may be substantially the same as that shown in Letters Patent of the United States No. 584,744, the invention is illustrated as employed for securing the fixed gripper jaw 20 to its carrier 22. The closing of the movable gripper jaw upon the fixed jaw to grip the stock, is effected by the rocker 24 and cam 26. The uplifting movement of the grippers to pull the stock is effected by the lever 28 and the cam 30. As will be understood from this figure and as fully explained in said Letters Patent to which, if desired, reference may be had for a further description of the mechanism, the gripper jaw 20 is subjected to severe strains when the grippers are closed to grip the stock and are then uplifted to pull the stock. To assist in resisting these strains the outer member of the coupling, which is the gripper carrier 22 of the machine, is recessed to interlock with a neck 32 which connects the inner member 1 of the coupling with the gripper jaw. The outer member or gripper carrier is also provided with plane side faces against which cheek plates 34 on the gripper jaw snugly fit. The engagement of these interlocking parts reinforces the holding power of the coupling in the direction to resist the strains to which the coupling is subjected when employed for uniting the gripper jaw to its carrier. Any other suitable forms of interlocking projections on the inner and outer members of the coupling may be provided for strengthening the coupling.

In Fig. 8 is shown a construction in which two shafts or portions of shafts having overlapping ends are united by a coupling embodying this invention. The two overlapping ends 36, 36 are suitably fitted together as shown and one of them is provided with a threaded aperture in alinement with a screw hole in the outer member. The screw forces the two members apart causing them to bind in the outer member. A recess, as 38, may be formed in the second overlapping shaft section to receive the end of the screw which thus forms a pin securing the two shaft sections against relative movement, more particularly against relative lengthwise movement tending to separate them.

In the use of the coupling the inner and outer members will be relatively adjusted to position the proper apertures in alinement and the screw 5 will then be inserted and adjusted until the inner member is expanded and caused to bind within the outer member. The expansion of the inner member centers or locates it properly within the outer member. If the inner member becomes contracted or otherwise works loose in the outer member the screw 5 will, if it projects into the aperture in the outer member, still retain the members against accidental separation.

Having explained the nature of the invention and how it may be used, I claim as new and desire to secure by Letters Patent of the United States:—

1. A coupling comprising an outer member having an opening of uniform cross section therein, an inner member formed to enter said opening or to be withdrawn therefrom, said inner member having a slit extending longitudinally thereof and dividing one portion of the member from another portion within the opening, and a screw threaded through one of said divided portions of the inner member and engaging the other portion to effect expansion of the member, the outer member having an aperture in position to afford access to the screw and elongated to permit said members to be secured together in different positions of adjustment, and the coupling being constructed to permit free relative sliding movement of the inner and outer members to separate said members when the screw is removed.

2. A coupling comprising an outer member having an opening of uniform cross section therein, an inner member having a part of uniform cross section to enter said opening, the inner member having a slit dividing one portion thereof from another portion within the opening, and a screw threaded through one of said divided portions of the inner member and engaging the other portion to effect lateral expansion of the member, the outer member having an aperture in position to receive the head of the screw, and the coupling being constructed to permit free relative movement of the inner and outer members to separate said members when the screw is removed.

3. In a coupling, the combination with a shaft section and a sleeve encircling and extending beyond the end portion thereof and secured thereto, of a second shaft section having its end portion slitted longitudinally and formed to enter said extended portion of the sleeve, the opening in said sleeve and the second shaft section within the opening being of uniform cross section, and a screw threaded laterally into said slitted portion of the second shaft section and arranged to expand said portion within the sleeve, the sleeve having an aperture formed to receive the head of the screw and elongated to permit the sleeve and the second shaft section to be secured in different relative positions of adjustment, the coupling being formed to permit free relative turning and endwise sliding movements of the sleeve and the second shaft section when the screw is removed.

In testimony whereof I have signed my name to this specification in the presence of two subscribing witnesses.

ALVAH C. SPENCER.

Witnesses:
 JAMES R. HODDER,
 ARTHUR L. RUSSELL.